United States Patent [19]

Laky et al.

[11] 4,421,286

[45] Dec. 20, 1983

[54] MOORING SYSTEM

[75] Inventors: Tibor Laky; William C. Lane, both of Dallas; Kebbie J. Turner, Sr., Frisco, all of Tex.

[73] Assignee: Otis Engineering Corporation, Dallas, Tex.

[21] Appl. No.: 395,116

[22] Filed: Jul. 6, 1982

Related U.S. Application Data

[63] Continuation of Ser. No. 63,059, Aug. 2, 1979, abandoned, which is a continuation of Ser. No. 235,457, Feb. 18, 1981, abandoned.

[51] Int. Cl.$^3$ .............................................. B64F 1/14
[52] U.S. Cl. ................................................... 244/116
[58] Field of Search ........................... 244/33, 115, 116

[56] References Cited

U.S. PATENT DOCUMENTS

| | | | |
|---|---|---|---|
| 1,531,352 | 3/1925 | Smith | 244/115 |
| 1,659,758 | 2/1928 | Auberlin | 244/116 |
| 1,914,408 | 6/1933 | Douglas | 244/116 |
| 3,905,567 | 9/1975 | Menke et al. | 244/115 |
| 3,972,493 | 8/1976 | Milne | 244/115 |
| 3,976,268 | 8/1976 | Crosby | 244/115 |

FOREIGN PATENT DOCUMENTS

| | | | |
|---|---|---|---|
| 733801 | 3/1943 | Fed. Rep. of Germany | 244/33 |
| 23152 | of 1913 | United Kingdom | 244/116 |
| 310104 | 4/1929 | United Kingdom | 244/116 |

*Primary Examiner*—Galen L. Barefoot
*Attorney, Agent, or Firm*—Thomas R. Felger; H. Mathews Garland

[57] ABSTRACT

A mooring system for controlling an aerostat. The mooring system can be easily aligned with the prevailing wind direction while the aerostat is flying or when moored. The mooring system can either be a fixed, permanent ground installation or a mobile installation. All winches required to control the aerostat during flight and to secure the aerostat to the mooring system are powered from the same source. A nose receptacle is included as part of the mooring system to allow the aerostat to carry a heavier payload. The mooring system includes a main winch system to control flight of the aerostat and close haul and nose line winches to aid in securing the aerostat.

17 Claims, 18 Drawing Figures

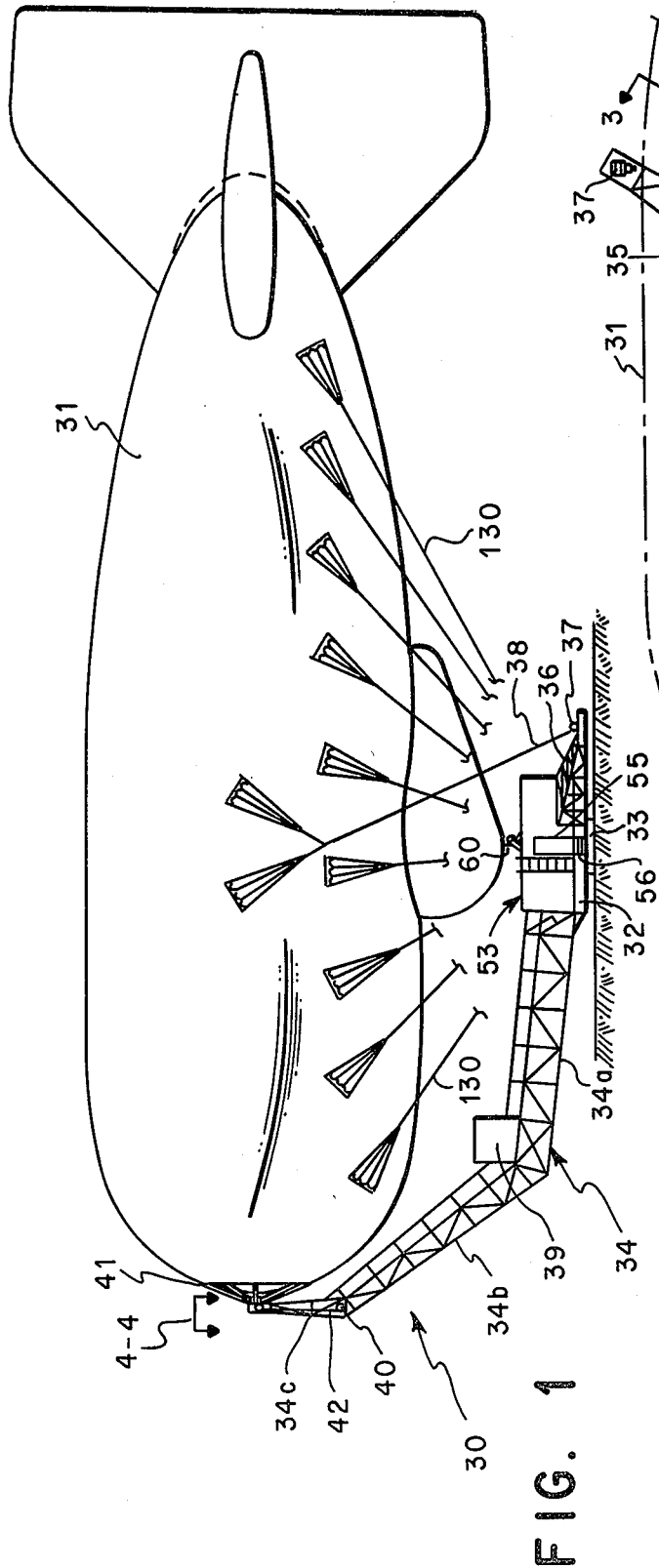
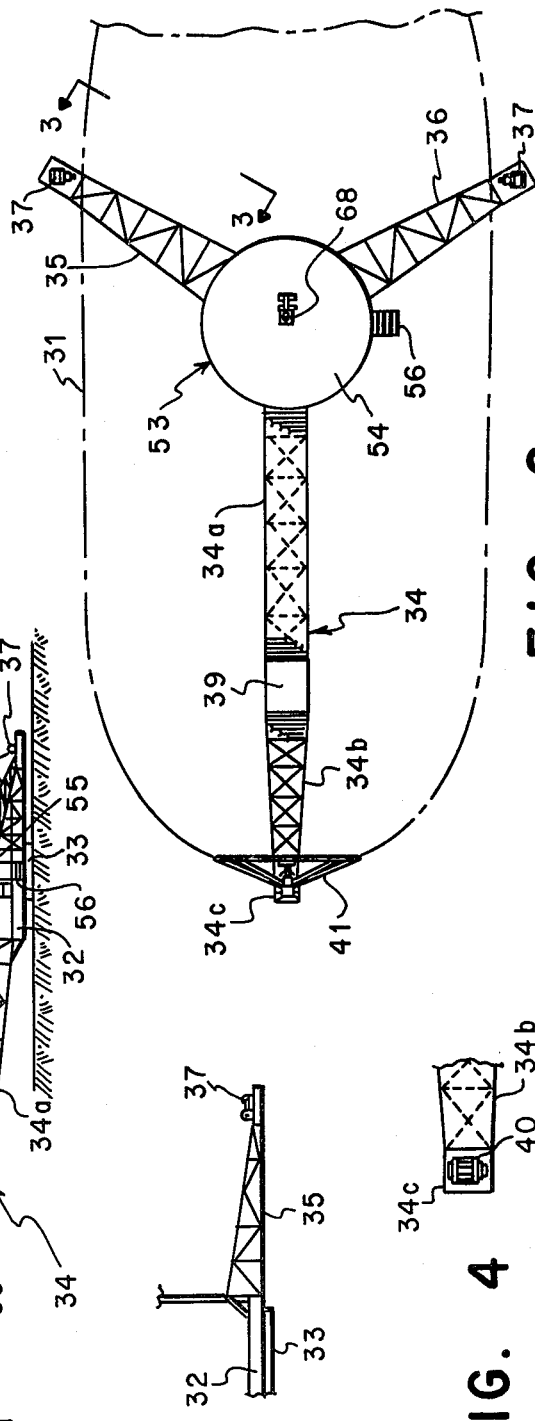

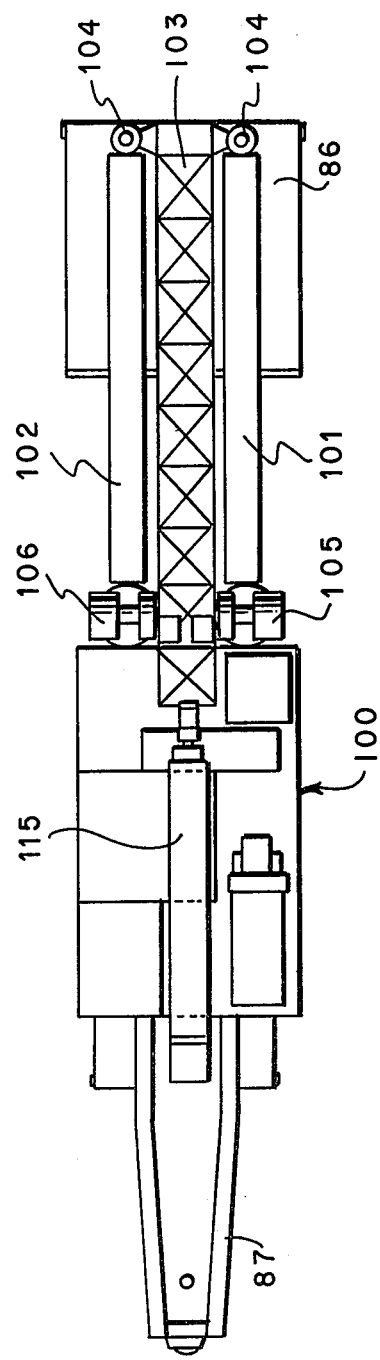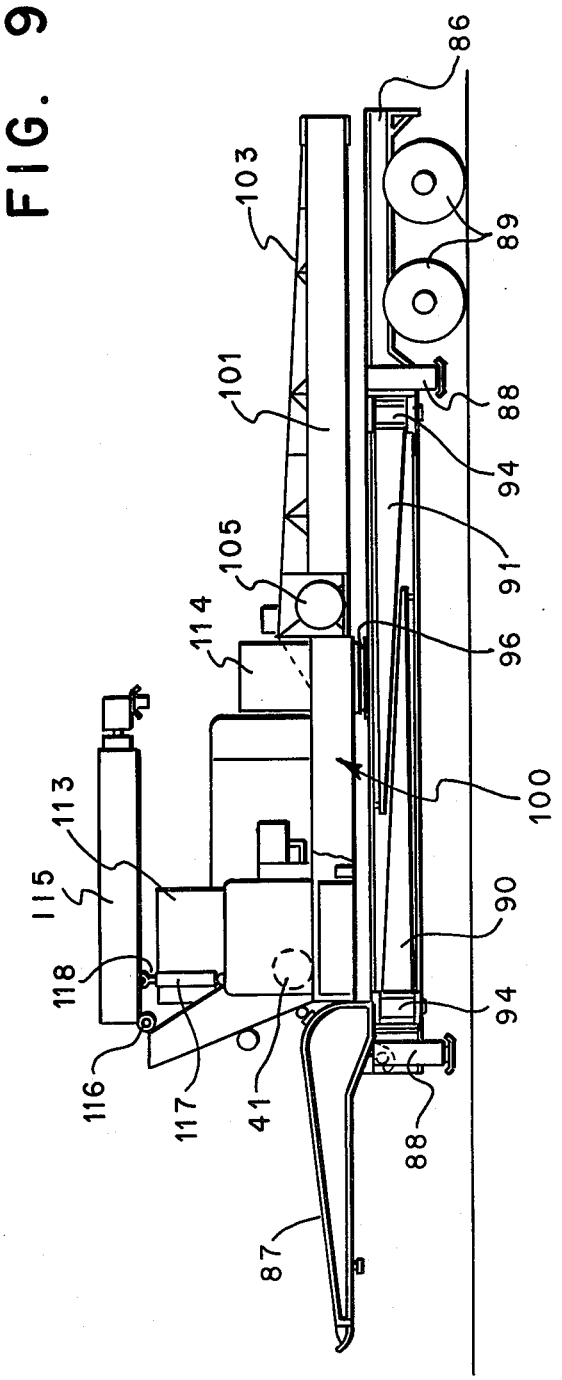

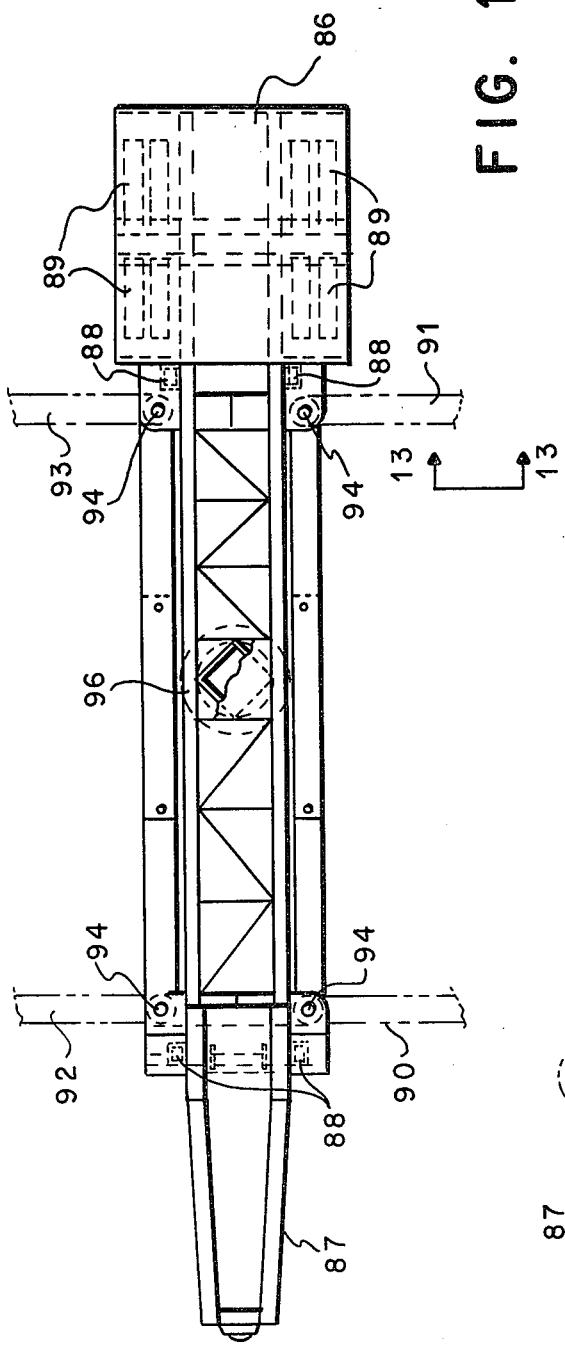
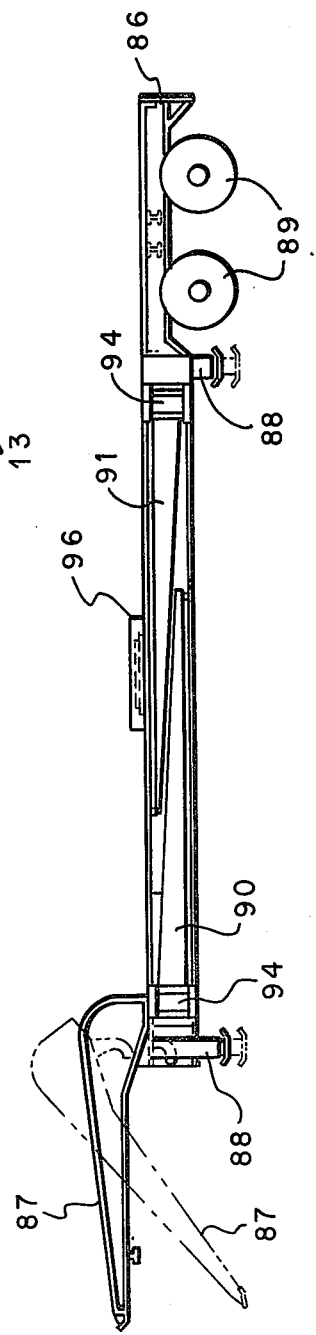
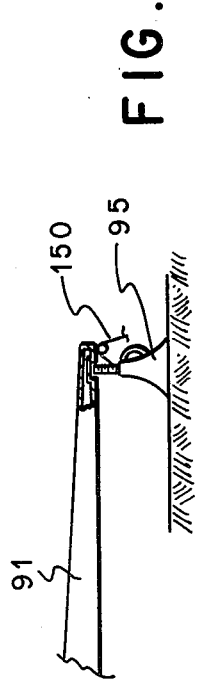
FIG. 11
FIG. 12
FIG. 13

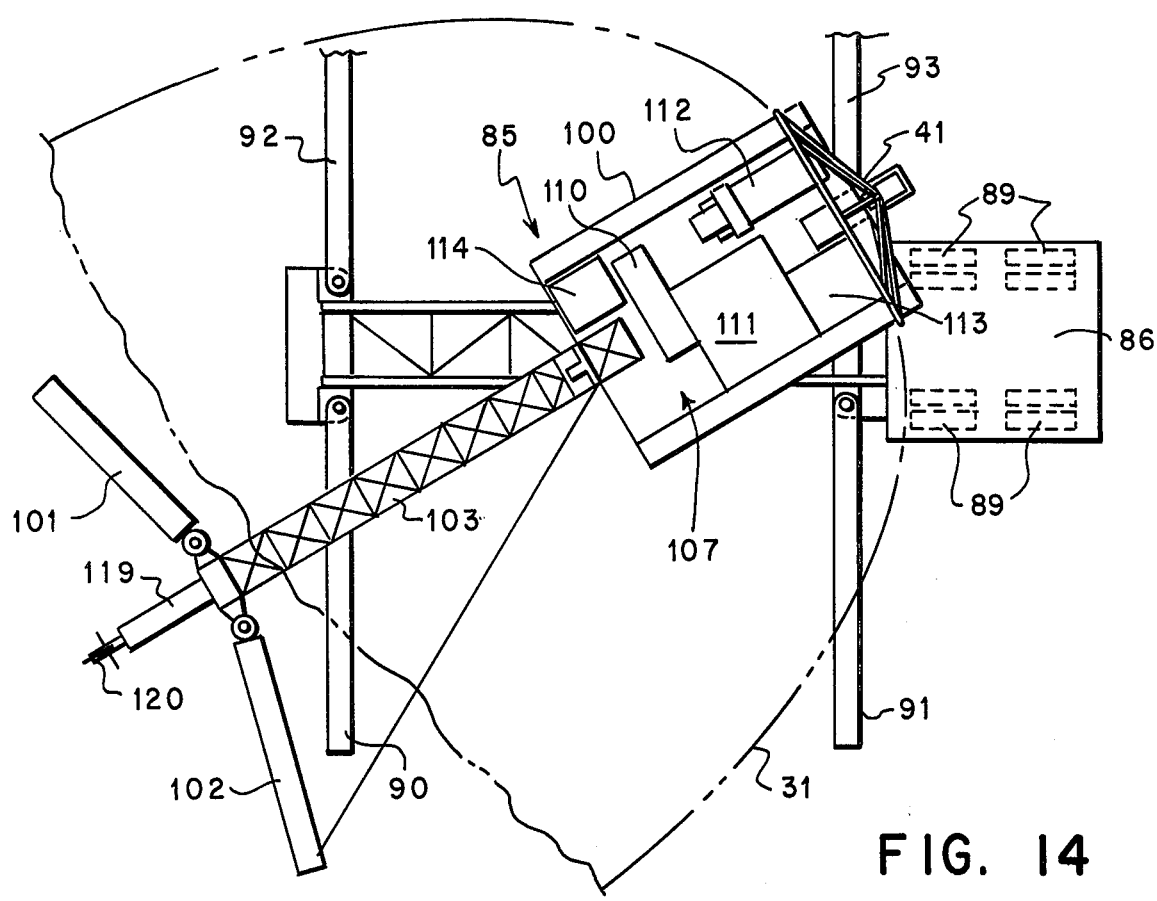
FIG. 14
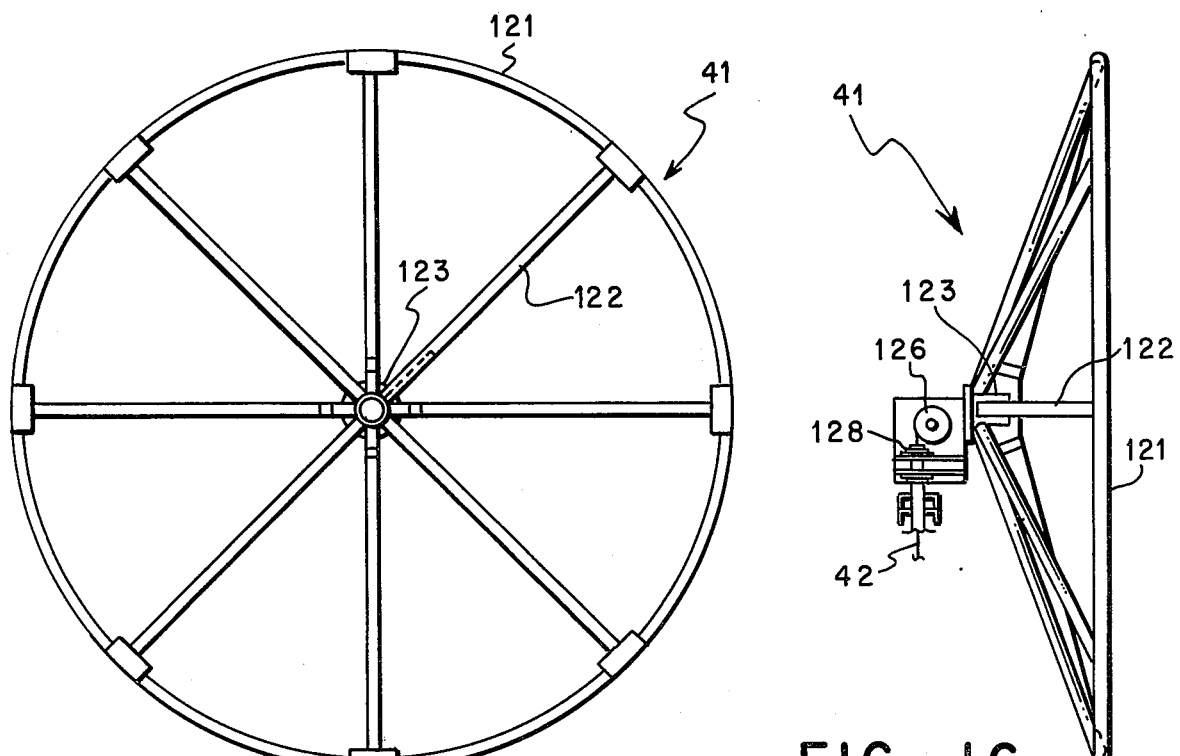
FIG. 15
FIG. 16

MOORING SYSTEM

This application is a continuation, of application Ser. No. 63,059, filed Aug. 2, 1979 which is a continuation of application Ser. No. 235,457 filed on Feb. 18, 1981, parent applications Ser. No. 63,059 and No. 235,457 have been abandoned.

BACKGROUND OF THE INVENTION

1. Field of the Invention

The present invention discloses a mooring system for aerostats. The mooring system can either be fixed at a permanent location or movable on a trailer.

2. Prior Art

A mooring system for a gas filled dirigible is shown in U.S. Pat. No. 3,972,493 to William G. Milne. The mooring system of this patent is not movable on a trailer and does not disclose any means for tethering the dirigible by the mooring system during flight.

A mooring system is disclosed in U.S. Pat. No. 3,976,268 to Edward L. Crosby, Jr. The mooring system of this patent does not disclose means for aligning the mooring system and winch with prevailing wind conditions during flight.

Neither of the above systems show nor teach the mast structure or platform of the present invention.

BRIEF SUMMARY OF THE INVENTION

The present invention discloses a mooring system for an aerostat comprising a platform means supported on a bearing, a mast structure extending from the platform means, a main winch system mounted on the platform means for releasing and retrieving the aerostat, means for securing the aerostat to the mast structure after the main winch system has retrieved the aerostat, and means for rotating the platform on the bearing.

One object of the present invention is to disclose a mooring system for an aerostat which can be easily aligned with prevailing wind directions.

Another object of the present invention is to provide a mooring system for an aerostat which is easily transported from one location to another.

A further object of the present invention is to provide a mooring system for an aerostat which increases the load carrying capacity of the aerostat by removing items normally fastened to the front end of the aerostat and incorporating these items as part of a nose receptacle carried by the mooring system.

Still another object of the present invention is to provide a mooring system for an aerostat which has a single prime mover supplying power to operate all of the components of the system.

A still further object of the present invention is to provide a mooring system for an aerostat which has a means for varying the distance between the confluence point, at which the main tether line from the aerostat attaches to the main winch system.

Another object of the present invention is to provide a mooring system which has means for varying the point at which the nose line attaches to the mast structure to accommodate various sizes of aerostats.

Additional objects and advantages of the present invention will be obvious to those skilled in the art from reading the following written description and claims in conjunction with the drawings.

BRIEF DESCRIPTION OF THE DRAWINGS

FIG. 1 is a schematical drawing of the present invention with an aerostat secured to the mooring system.

FIG. 2 is a plan view of the mooring system in FIG. 1 with the aerostat partially shown in dotted lines.

FIG. 3 is a partially cut away view in elevation along line 3—3 of FIG. 2 showing an outrigger of the mooring system in FIG. 1 extending from the platform.

FIG. 4 is a cut away plan view along line 4—4 of FIG. 1 showing an nose line winch carried on the vertical section of the mast structure.

FIG. 9 is a plan view of the mooring system configured for transport on a mobile trailer.

FIG. 10 is an elevational view of the mooring system of FIG. 9.

FIG. 11 is a plan of the trailer shown in FIG. 9.

FIG. 12 is an elevational view of the trailer shown in FIG. 11.

FIG. 13 is a partially cut away drawing in elevation showing supports for the trailer in FIG. 11.

FIG. 14 is a plan view partially cut away showing the mooring system of FIG. 8 with the aerostat aligned with the prevailing wind direction.

FIG. 15 is a front view of the nose receptacle with the vertical section not shown.

FIG. 16 is a side view of the nose receptacle with the vertical section partially cut away.

WRITTEN DESCRIPTION OF THE PREFERRED EMBODIMENTS

Figure 5:
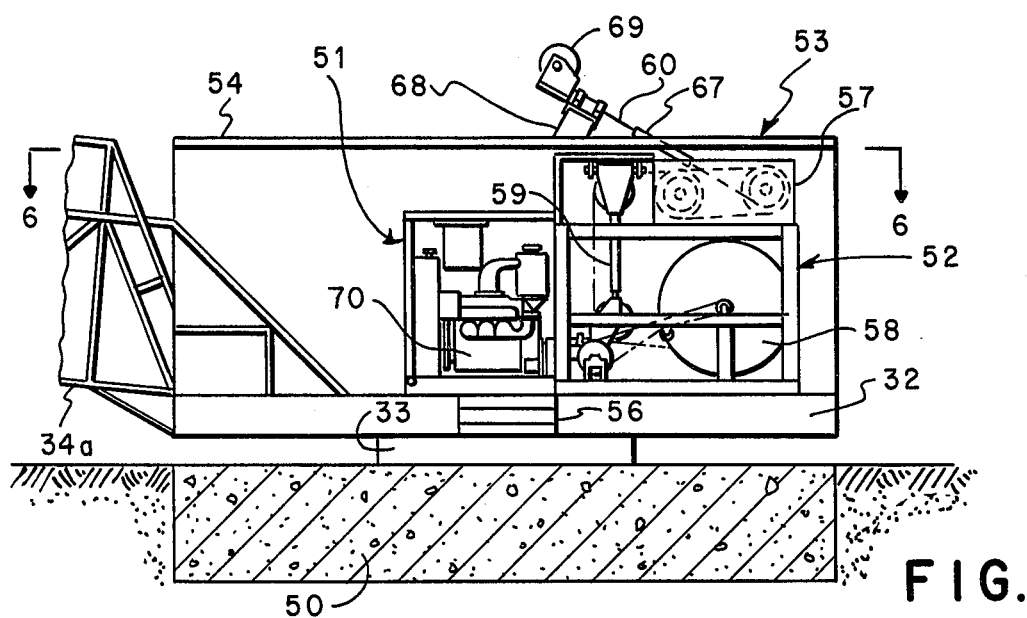
FIG. 5 is a schematical drawing, partially in elevation and partially in section, showing the platform, bearing, and foundation for the mooring system of FIG. 1.

Referring to the drawings and particularly FIGS. 1, 2, 3, and 4, the large, fixed land based embodiment of the present invention is shown. Aerostat 31, a tethered balloon, is shown secured to mooring system 30. Platform means 32 is rotatably mounted on bearing 33. The remaining components of mooring system 30 are supported by and attached to platform means 32. Bearing 33 is preferably a large heavy duty crane bearing.

A large mast structure extends radially from platform means 32 to provide locations for securing aerostat 31 to mooring system 30. The mast structure has three major component parts, main boom 34 and outriggers 35 and 36. Each outrigger has a close haul winch 37 near the end opposite platform means 32. Mooring lines 38, attached to opposite sides of aerostat 31, can be engaged with a respective close haul winch 37 to maintain the centerline of aerostat 31 aligned with main boom 34 after aerostat 31 has been retrieved by mooring system 30.

Main boom 34 has three major sections. One section 34a extends essentially horizontally from platform means 32. A control station 39 is located near the end of section 34a opposite platform means 32. As will be explained later, control station 39 contains all of the controls necessary to operate mooring system 30. A transition section 34b joins horizontal section 34a with vertical section 34c.

Vertical section 34c has a nose line winch 40 located near the junction of sections 34b and 34c. A nose receptacle 41, sized to receive the front end of aerostat 31, is mounted at the top of vertical section 34c. Nose receptacle 41 will be decribed later in more detail. Nose line 42 can be threaded from the front end of aerostat 31 through nose receptacle 41 and engaged with nose line winch 40. When mooring system 30 has retrieved aerostat 31, nose line winch 40 and close haul winches 37 provide means for securing aerostat 31 to the mast structure. Main boom 34 has the necessary catwalks and ladders to provide personnel access to control station 39, nose line winch 40, and nose receptacle 41.

Figure 6:
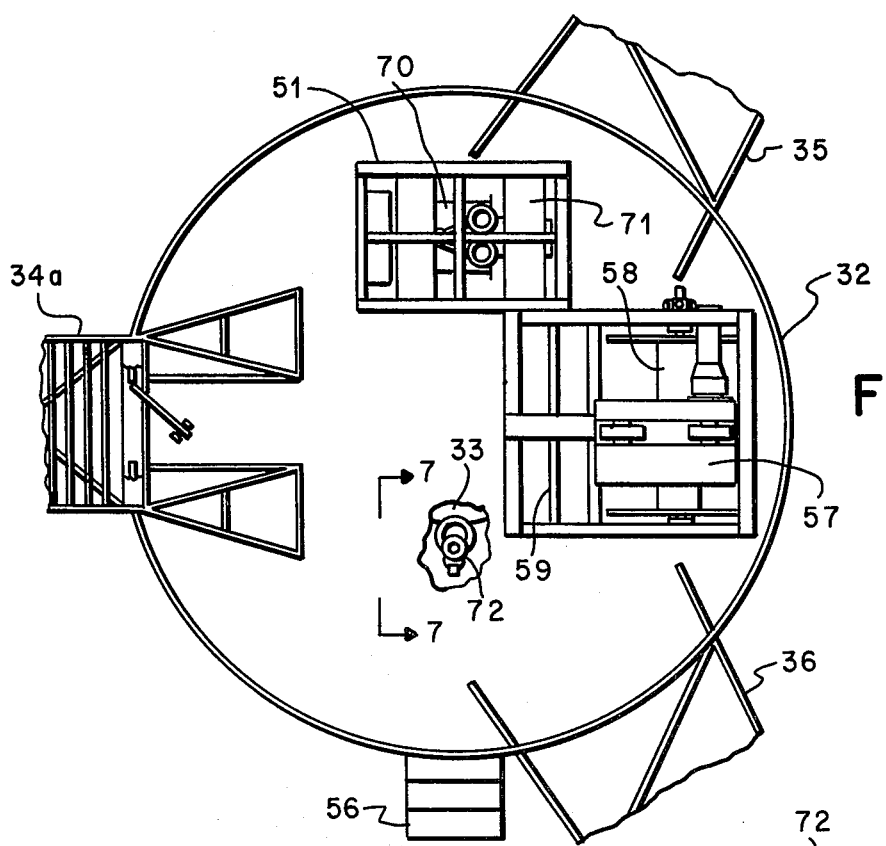
FIG. 6 is a plan view along lines 6—6 of FIG. 5 showing the prime mover and main winch system located on the platform.
Figure 7:
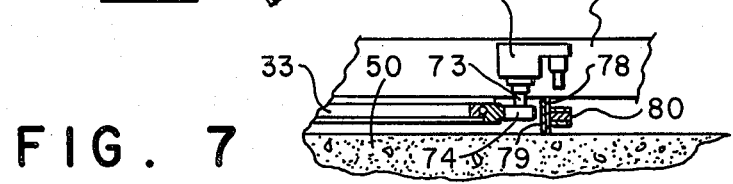
FIG. 7 is a cut away view partially in section and partially in elevation showing the means for rotating the platform on the bearing.

As best shown in FIGS. 5 and 6, bearing 33 is preferably fixed to a reinforced concrete foundation 50. A prime mover 51 and main winch system 52 are mounted on platform 32. A cylindrical housing 53 with a smooth, flat roof 54 encloses the equipment located on platform 32 preventing damage to aerostat 31 from contacting this equipment. Opening 55 and steps 56 are provided to allow personnel access to the equipment located on platform means 32 and to main boom section 34a.

Main winch system 52 contains a traction unit 57, spooling unit 58 and automatic level wind means 59. Traction unit 57 pays out and retrieves line 60 which controls aerostat 31 during flight. Line 60 is stored by spooling unit 58 when not in use. A guide tube 67 projects through roof 54 to provide an opening for line 60. Also, fairlead support or boom 68 projects from roof 54 with fairlead sheave 69 attached thereto.

Figure 18:
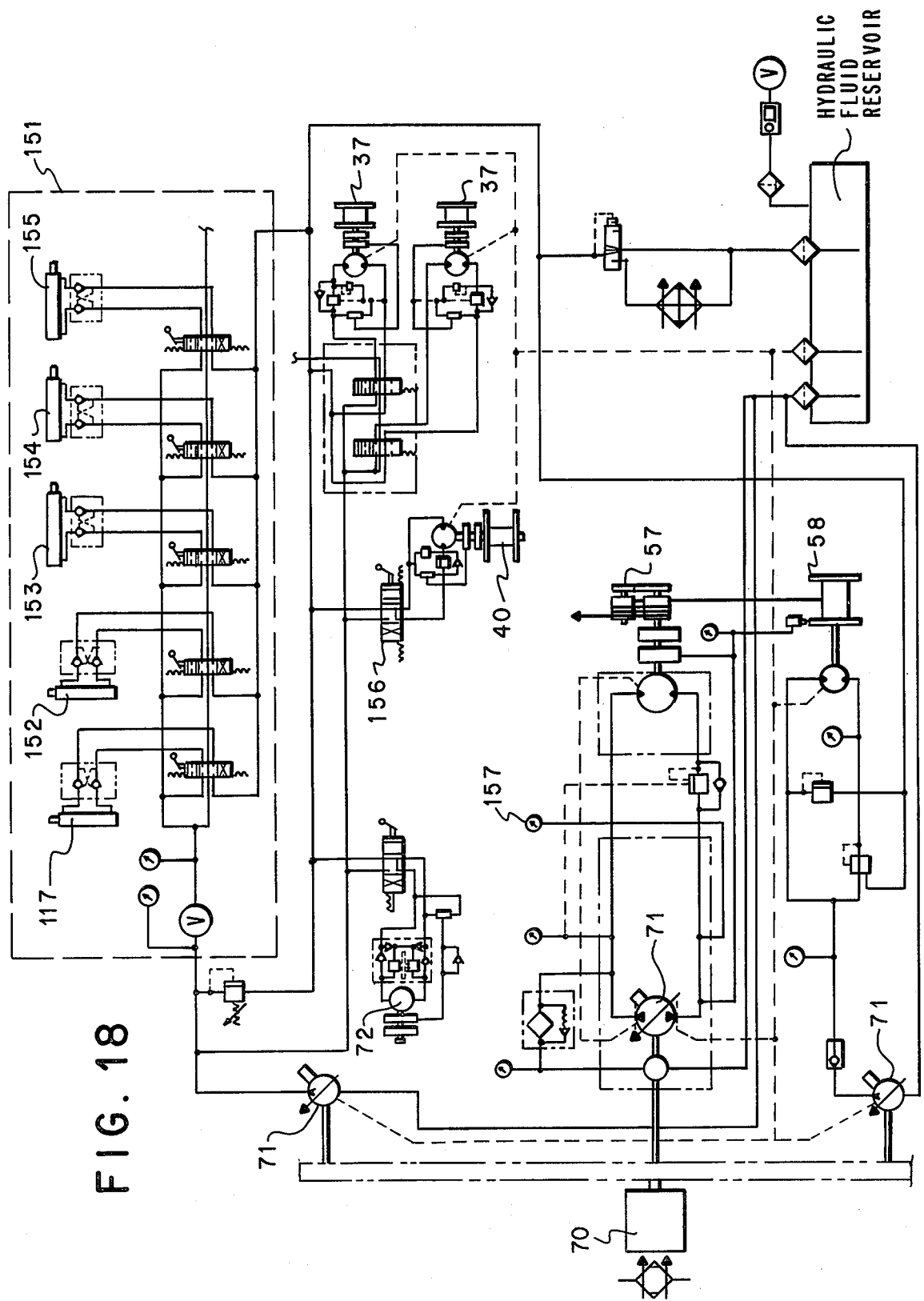
FIG. 18 is a schematical drawing of a hydraulic fluid distribution system for operating the mooring system.

Prime mover 51 comprises an internal combustion engine 70 which powers various hydraulic pumps 71 to operate all of the winch systems and hydraulic components. FIG. 18 is a schematic of a typical hydraulic fluid distribution system and will be described later.

Hydraulic fluid is also supplied to turning motor and reduction gears 72 mounted on platform 32. Operating shaft 73 with drive gear 74 extends from turning motor and reduction gears 72. The teeth in drive gear 74 engage matching teeth on the outside diameter of bearing 33. Turning motor and reduction gears 72 and drive gear 74 comprise means for rotating the platform means 32 on bearing 33.

Lightning protection for mooring system 30 is provided by two concentric shields 78 and 79. Shield 78 extends downwardly from platform 32, and shield 79 extends upwardly from foundation 50. A small cap is provided between the two concentric shields to encourage lightning to flow through the shields to ground rather than through bearing 33. A brush 80 is provided to maintain electrical contact between the two shields to prevent the buildup of a static electrical charge.

Referring to FIGS. 8 through 14, the present invention can be readily adapted to provide a mooring system 85 mounted on a mobile trailer 86. Mooring system 85 could also be mounted on a railroad car or waterborne vessel.

Trailer 86, as best shown in FIGS. 11 and 12, has a removable gooseneck 87 which allows a standard tractor to move trailer 86 over highways. When trailer 86 with mooring system 85 arrives at a desired location for flying the aerostat, four jacks 88 are activated to lift trailer 86 removing the load from wheels 89. As shown by dotted lines in FIG. 12, gooseneck 87 can be removed to allow unrestricted rotation of mooring system 85.

Supporting arms or stabilizers 90, 91, 92 and 93 are each respectively attached by a separate pivot pin assembly 94 to the side of trailer 86. As shown by dotted lines in FIGS. 11, each arm 90-93 can be pivoted to an extended position perpendicular to the centerline of trailer 86. A manual jack 95 can be positioned under the outer end of each arm 90-93. The manual jacks 95 and arms 90-93 cooperate to provide lateral stability for trailer 86 while mooring system 85 controls an aerostat. Guy wires 150 are also fixed from the end of each arm 90-93 to the ground. Guy wires 150 counter forces generated by aerostat 31 which would tend to lift trailer 86.

A large bearing 96 is located on the centerline of trailer 86 approximately equal distance between the four jacks 88. Platform means 100 is rotatably attached to bearing 96. The remaining components of mooring system 85 are in turn mounted on and/or attached to platform means 100. Mast structure 103 extends horizontally from the rear of platform 100. Outriggers 101 and 102 are rotatably attached to mast structure 103 by pivot assemblies 104. Close haul winches 105 and 106 are positioned near the outer end of outriggers 101 and 102 respectively. These close haul winches serve the same function as winches 37 in mooring system 30. If desired, outriggers 101 and 102 can be telescoping booms to accommodate aerostats of various sizes. For clarity, outrigger 101 and winch 105 are not shown in FIG. 8.

A main winch system 107 is located on platform 100 comprising traction unit 110 and spooling unit 111. A prime mover 112, preferably a gasoline or diesel powered internal combustion engine, is also located on platform 100 along with a central control station 113 and hydraulic power unit 114.

Figure 8:
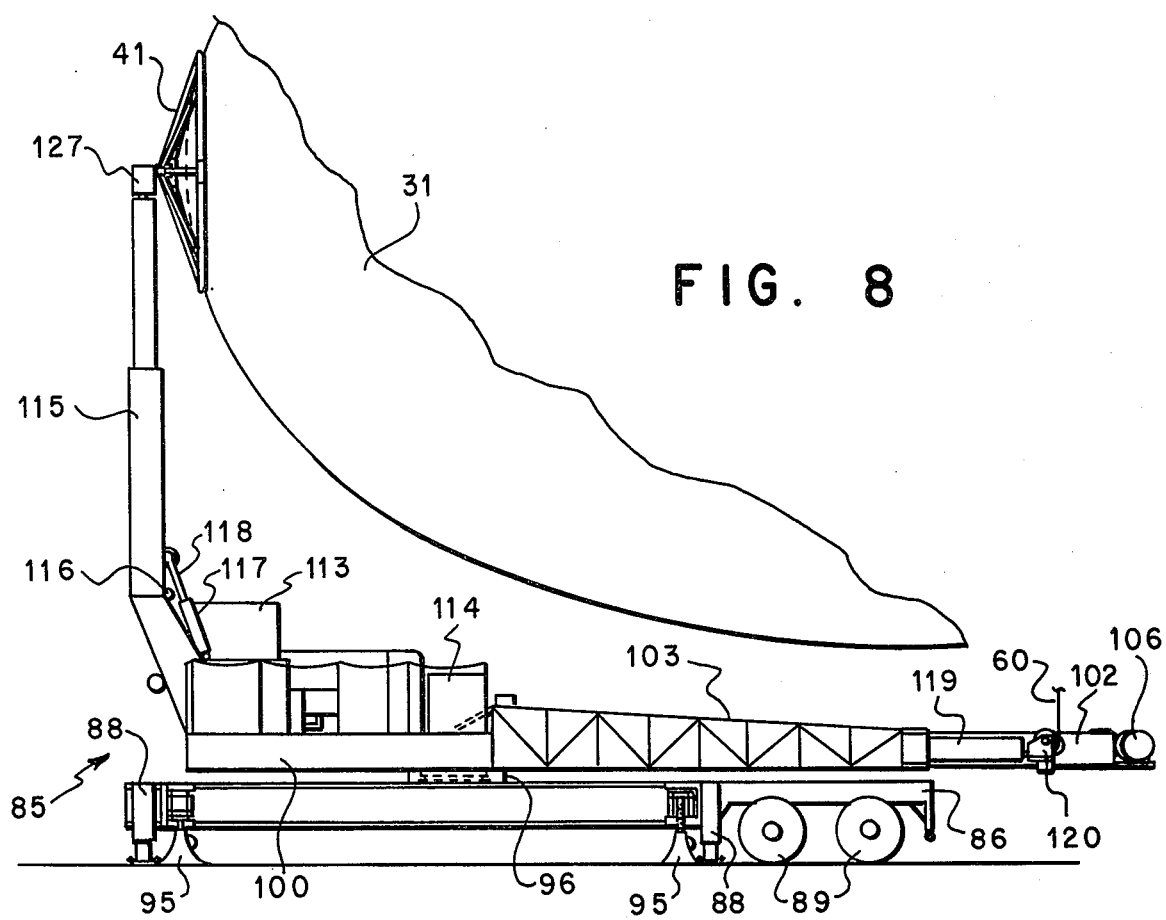
FIG. 8 is a schematic drawing showing the mooring system of the present invention on a mobile trailer with the aerostat partially cut away. The outrigger nearest the viewer is not shown.
Figure 17:
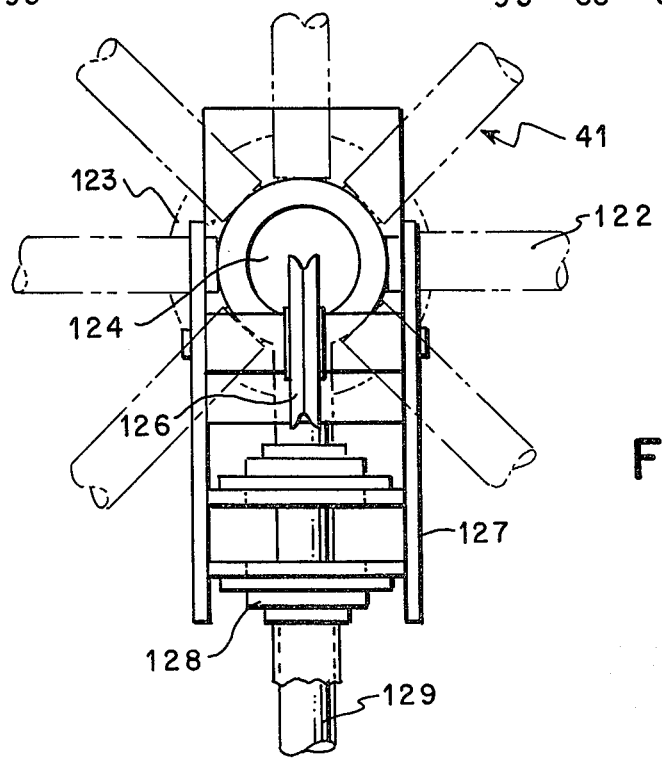
FIG. 17 is an enlarged view of the vertical section and sheaves for guiding the nose line. The nose receptacle is partially shown in dotted lines.

Mooring system 85 varies from mooring system 30 because vertical section 115 can be telescoped to a retracted position and then rotated to a horizontal position parallel with the centerline of trailer 86. This is required to make mooring system 85 fully mobile on standard highways. The one portion of mast structure 34, vertical section 34c, is fixed in its relationship to platform 34. As best shown in FIGS. 10 and 8, vertical section 115 can be pivoted around pin 116 by hydraulic cylinder 117 and ram 118. The supply of hydraulic fluid to cylinder 117 is controlled from central station 113. A hydraulic cylinder (not shown) can be contained within vertical section 115 to extend nose receptacle 41 relative to platform means 100.

Mooring system 85 also varies from mooring system 30 because aerostat 31 does not have a confluence point directly above traction unit 110. Mast structure 103 has a tailpiece or fairlead boom 119 which can be extended horizontally by a hydraulic cylinder (not shown). Fairlead sheave 120 is attached to the outer end of tailpiece 119 and provides the confluence point for line 60 attached to aerostat 31.

Both mooring systems use a nose receptacle 41 which can be varied in size to conform to the geometry of the front end of the aerostat being flown by the particular mooring system. The nose receptacle can be covered by a heavy, flexible cloth (not shown) to prevent the metal portions of the receptacle from damaging the aerostat. Some aerostats have metal support members built into their front end to protect the aerostat and support the nose section while moored. Using a nose receptacle as part of the mooring system reduces the weight of the aerostat and allows a larger payload. As shown in FIG. 10, nose receptacle 41 can be detached and stored while transporting mooring system 85.

Nose receptacle 41 is best shown in FIGS. 15 and 16. It is generally conical with a circular opening defined by ring 121. Spokes 122 extend between ring 121 and hub 123. Hub 123 forms the apex of the cone and has a circular opening 124 therethrough. Both vertical sections 115 and 34c have a sheave 126 mounted adjacent to opening 124. Sheave 126 is preferably contained within a housing 127 which can rotate with respect to either vertical sections 115 and 34c. Rotation is allowed by bearing assembly 128. Nose line 42 is directed through hollow guide tube 129 to prevent fouling the nose line when nose receptacle 41 rotates. Nose receptacle 41 can be permanently fixed with relation to the respective vertical section. However, a rotating nose receptacle is preferred to compensate for any sudden cross winds while docking aerostat 31.

As shown in FIG. 14 mooring system 85 can rotate 360° with respect to trailer 86. Also, short tethering lines 130 can be used to attach aerostat 31 to the mast structure allowing the lines connected to the various winches to be disengaged for maintenance. Nose line 42 can be permanently attached to the front end of aerostat 31 and threaded through nose receptacle 41, sheave 126 and onto the nose line winch. Alternatively, an automatic quick release shackle could be used to engage nose line 42 with a short line hanging from the front end of aerostat 31. This latter alternative would result in aerostat 31 having to carry less weight because most of nose line 42 would remain on the mooring system.

FIG. 18 is a schematic drawing of a typical hydraulic system to operate either mooring system 30 or 85. Wide variations are available because hydraulic winches could be replaced by manual or electric winches. The portion of the drawing enclosed by dotted lines 151 represents components of mobile mooring system 85. These components are not usually included on the fixed mooring system 30. Hydraulic cylinders 154 and 155 were not shown in previous drawings and can be used to extend longitudinally outriggers 101 and 102 respectively. Hydraulic cylinder 153 is used to extend tailpiece or fairlead boom 119. This is an important advantage of the present invention to allow varying the confluence point at which line 60 attached to aerostat 31 first engages the mooring system of the invention. Varying the confluence point is an important feature of the present invention to accommodate various different aerostat configurations. Hydraulic cylinder 152 is contained within vertical section 115 and is used to extend nose receptacle 41. All control valves, such as four-way two position spring centered valve 156, can be located within control station 39 and/or 113 along with pressure gauges such as 157. Standard hydraulic symbols are used to designate the various components of the hydraulic fluid distribution system.

The present invention can be used with various types of mooring systems. The previous description is illustrative of only two general mooring systems. Those skilled in the art will readily see other variation for a mooring system. Changes and modifications may be made without departing from the scope of the invention which is defined in the claims.

What is claimed is:

1. A mooring system for an aerostat, comprising:
   a. a platform means supported on a bearing;
   b. a mast structure extending from the platform means;
   c. a main winch system mounted on the platform means for releasing and retrieving the aerostat;
   d. means for rotating the platform on the bearing;
   e. the mast structure further comprising a vertical section with a nose receptacle mounted thereon, the nose receptacle being adapted to engage the aerostat, outriggers extending horizontally from the platform and spaced radially from each other, and means for securing the aerostat to the outriggers;
   f. fairlead sheave means for a tether line from the main winch system to the aerostat; and
   g. movable support means for the fairlead sheave means for adjusting the distance between the mast structure and the fairlead sheave means to accommodate various aerostat sizes.

2. A mooring system as defined in claim 1 wherein the bearing is secured to a mobile trailer.

3. A mooring system as defined in claim 1 wherein the bearing is secured to a foundation comprising reinforced concrete.

4. A mooring system as defined in claim 1, wherein the nose receptacle further comprises:
   a. a conical section with a circular opening to receive the front end of the aerostat; and
   b. flexible material covering the opening whereby the aerostat is protected from the nose receptacle.

5. A mooring system as defined in claim 1 wherein the outriggers are attached by a pivot to the platform and are movable with respect to the platform.

6. A mooring system as defined in claim 1, wherein the vertical section further comprises:
   a. winch means carried by the vertical section; and
   b. means for directing a line from the front end of the aerostat through the nose receptacle to the winch means.

7. A mooring system as defined in claim 1, further comprising:
   a. a nose line winch carried on the vertical section;
   b. a close haul winch carried on each outrigger; and
   c. the noseline and close haul winches providing means for securing the aerostat to the mast structure.

8. A mooring system as defined in claim 7 wherein the power to operate each winch and to rotate the platform is supplied from a prime mover mounted on the platform.

9. A mooring system as defined in claim 1 wherein said mast structure is a cantilever assembly mounted at the first end on the platform means at a location horizontally spaced from the second opposite end of the structure which connects with the nose end of the aerostat.

10. A mooring system as defined in claim 9 wherein the mast structure is a foldable articulated structure.

11. A mooring system as defined in claim 10 wherein said bearing is mounted on a mobile trailer.

12. A mooring system for an aerostat, comprising:
   a. a platform supported on a bearing;
   b. a mast structure extending from the platform;

c. one portion of the mast structure having a vertical section with a nose receptacle mounted thereon;
d. the nose receptacle being adapted to receive the forward end of the aerostat;
e. other portions of the mast structure comprising outriggers extending from the platform and spaced radially from the one portion;
f. a main winch system, carried on the platform, for releasing and retrieving the aerostat;
g. fairlead sheave means for a tether line from the main winch system to the aerostat;
h. movable support means for the fairlead sheave means for adjusting the distance between the mast structure and the fairlead sheave means to accommodate various aerostat sizes;
i. means for securing the aerostat to the vertical section and to the outriggers; and
j. means for rotating the platform and attached mast structure on the bearing.

13. A mooring system as defined in claim 12, wherein the means for securing the aerostat further comprises:
a. close haul winches carried on each outrigger; and
b. a nose line winch carried on the vertical section.

14. A mooring system as defined in claim 13 wherein the power to operate each winch and to rotate the platform is supplied from a prime mover mounted on the platform.

15. A mooring system as defined in claim 12 wherein the bearing is secured to a mobile trailer.

16. A mooring system for an aerostat, comprising:
a. a crane bearing secured to a foundation;
b. a platform rotatably supported on the crane bearing;
c. a mast structure extending from the platform;
d. one portion of the mast structure comprising a vertical section and a horizontal section;
e. the vertical section having a nose receptacle mounted thereon to receive the front end of the aerostat;
f. a nose line winch, carried on the vertical section, to assist in engaging the front end of the aerostat with the nose receptacle;
g. an operator's control station located on the one portion of the mast between the vertical section and the platform;
h. other portions of the mast structure comprising two outriggers;
i. each outrigger extending from the platform and spaced radially about the bearing from the one portion;
j. each outrigger having a close haul winch to aid in securing the aerostat to the mast structure;
k. a main winch system, carried on the platform, for controlling the aerostat;
l. means for securing the aerostat to the mast structure after the main winch system has retrieved the aerostat;
m. fairlead sheave means for a tether line from the main winch system to the aerostat;
n. movable support means for the fairlead sheave means for adjusting the distance between the fairlead sheave means and the mast structure to accommodate aerostats of different sizes;
o. a prime mover, carried on the platform, to supply power to operate the main winch system, the close haul winches, and the nose line winch; and
p. means for rotating the platform and attached mast structure on the bearing whereby the mast structure can be aligned with prevailing wind conditions to assist in releasing and retrieving the aerostat.

17. A mooring system for an aerostat, comprising:
a. a bearing mounted on a movable trailer;
b. a platform rotatably supported on the bearing;
c. means for rotating the platform in the bearing;
d. a main winch system mounted on the platform for releasing and retrieving the aerostat;
e. a mast structure extending from the platform;
f. one portion of the mast structure having a vertical section with a nose guide receptacle attached thereto;
g. the nose guide receptacle being adapted to receive the front end of the aerostat;
h. means for securing the aerostat to the nose guide receptacle after the main winch system has retrieved the aerostat;
i. means for raising and lowering the vertical section;
j. other portions of the mast structure comprising outriggers which are attached by pivots to the platform whereby the outriggers can be pivoted to be aligned with the trailer for transport of the mooring system;
k. a fairlead sheave for a tether line from the main winch system to the aerostat; and
l. a movable support for the sheave secured to the platform for adjusting the distance between the sheave and the vertical section to adapt the mooring system to aerostats of different sizes.

* * * * *